(12) United States Patent
Baldwin et al.

(10) Patent No.: US 8,756,767 B1
(45) Date of Patent: Jun. 24, 2014

(54) BUNDLING DEVICE

(75) Inventors: Jeffrey P. Baldwin, Phoenix, AZ (US);
Iven Dieterle, Tempe, AZ (US);
Richard L. Cleghorn, Tempe, AZ (US)

(73) Assignee: Hubbell Incorporated, Shelton, CT (US)

( * ) Notice: Subject to any disclaimer, the term of this patent is extended or adjusted under 35 U.S.C. 154(b) by 582 days.

(21) Appl. No.: 13/050,863

(22) Filed: Mar. 17, 2011

Related U.S. Application Data

(63) Continuation-in-part of application No. 12/821,059, filed on Jun. 22, 2010, now Pat. No. 8,584,324.

(60) Provisional application No. 61/219,258, filed on Jun. 22, 2009, provisional application No. 61/315,360, filed on Mar. 18, 2010, provisional application No. 61/315,364, filed on Mar. 18, 2010.

(51) Int. Cl.
*B65D 67/02* (2006.01)
*F16B 2/10* (2006.01)
*F16L 3/23* (2006.01)
*F16B 45/02* (2006.01)
*F16B 45/04* (2006.01)

(52) U.S. Cl.
USPC ........ 24/16 R; 24/599.3; 24/600.7; 24/601.6; 24/132 R; 24/134 L

(58) Field of Classification Search
USPC ........... 24/599.3, 600.7, 601.6, 132 R, 134 L, 24/132 WL, 16 R; 70/16
See application file for complete search history.

(56) References Cited

U.S. PATENT DOCUMENTS

| | | | |
|---|---|---|---|
| 28,669 A * | 6/1860 | Henshaw | 24/599.3 |
| 132,247 A * | 10/1872 | Burdict et al. | 24/599.3 |
| 677,627 A * | 7/1901 | Booth | 24/599.3 |
| 766,263 A | 8/1904 | Judd | |
| 772,468 A * | 10/1904 | Malby | 70/16 |
| 1,014,118 A * | 1/1912 | Carberry | 70/16 |
| 1,725,609 A * | 8/1929 | Amos | 24/599.3 |
| 1,806,163 A | 5/1931 | Hoglund | |
| 3,310,852 A | 3/1967 | Flanders | |
| 3,429,985 A | 2/1969 | Czigler | |
| 3,530,543 A | 9/1970 | Desmarais et al. | |
| 3,574,900 A | 4/1971 | Emery | |
| 3,654,668 A | 4/1972 | Appleton | |
| 3,660,869 A | 5/1972 | Caveney et al. | |
| 3,859,693 A * | 1/1975 | Breed | 24/600.7 |
| 3,910,280 A | 10/1975 | Talonn | |
| 3,953,911 A | 5/1976 | Fishack | |
| 4,123,095 A | 10/1978 | Stehlin | |
| 4,278,042 A | 7/1981 | Lindquist | |
| 4,340,998 A | 7/1982 | Liberge | |
| 4,361,938 A | 12/1982 | Emery | |
| 4,380,101 A | 4/1983 | Joubert et al. | |
| 4,483,556 A | 11/1984 | Livolsi | |
| 4,511,164 A | 4/1985 | Orchard | |
| 4,650,925 A | 3/1987 | Coldren | |
| 4,669,688 A | 6/1987 | Itoh et al. | |
| 4,870,722 A | 10/1989 | Shell, Jr. | |

(Continued)

*Primary Examiner* — Robert J Sandy
(74) *Attorney, Agent, or Firm* — Alfred N. Goodman; Mark S. Bicks

(57) ABSTRACT

A device holder including a body having a receiving opening, an arm having a first engagement member on a first end and a second engagement member on a second end, the first engagement member releaseably secured within the receiving opening, and the second engagement member slidably secured to the body.

23 Claims, 7 Drawing Sheets

(56) References Cited

U.S. PATENT DOCUMENTS

| | | |
|---|---|---|
| 4,956,897 A | 9/1990 | Speedie |
| 4,958,791 A | 9/1990 | Nakamura |
| 4,991,265 A | 2/1991 | Campbell et al. |
| 5,056,248 A | 10/1991 | Blanchard |
| 5,083,741 A | 1/1992 | Sancoff |
| 5,210,911 A | 5/1993 | Brown et al. |
| 5,228,174 A | 7/1993 | Beasley |
| 5,293,669 A | 3/1994 | Sampson |
| 5,317,788 A | 6/1994 | Esposito et al. |
| 5,349,779 A | 9/1994 | Ben-Dror |
| 5,729,872 A | 3/1998 | Ginocchio |
| 6,101,684 A | 8/2000 | Ginocchio |
| 6,742,223 B1 * | 6/2004 | Chang ............... 24/16 R |
| 7,500,643 B2 * | 3/2009 | Leone et al. ............ 248/56 |
| 7,900,324 B2 * | 3/2011 | Ginocchio ............. 70/16 |

* cited by examiner

BUNDLING DEVICE

CROSS REFERENCE TO RELATED APPLICATIONS

This application is a continuation-in-part of currently pending U.S. patent application Ser. No. 12/821,059 to Shotey et al. entitled "Mobile Cable Holder" which was filed on Jun. 22, 2010, which application claims benefit to the Provisional Patent Application Ser. No. 61/219,258 to Shotey et al. entitled "Mobile Cable Holder" which was filed Jun. 22, 2009, the disclosures of which are hereby incorporated herein by reference.

This application also claims the benefit of the filing dates of U.S. Provisional Patent Application Ser. No. 61/315,360 to Baldwin et al. entitled "Bundling Device" which was filed on Mar. 18, 2010, and to U.S. Provisional Patent Application Ser. No. 61/315,364 to Baldwin et al. entitled "Bundling Device" which was filed on Mar. 18, 2010, the disclosures of which are hereby incorporated herein by reference.

BACKGROUND OF THE INVENTION

1. Technical Field

Aspects and implementations of the device holder relate to a mechanism and method for holding a cable, a hose, a wire, a flexible pipe, a rigid pipe, a rigid tube, a flexible tube, a rigid cylinder, a flexible cylinder, a chain, a cord, a rope, a coil, a line, a band, a lanyard, twine, a plurality of items, and/or the like.

2. Background Art

Cable holders and devices for bundling or storing items are well known. Traditional cable holders include a hand-cuff like element with jaws that are self-sustained in an open position while an item is bundled within the jaws. While jaws self-sustained in the open position ensure that the item can be located within the jaws, the user is required to manipulate the item and the jaws to encircle the item, thereby requiring a great deal of dexterity.

There are multiple variations of cable holders and devices known in the art including designs that use two separate jaws rotatably mounted together or a single piece unit that can flex to encircle the item. Nevertheless, cable holders require an inordinate amount of control to accomplish the goal of containing the item.

SUMMARY

This disclosure includes one or more device holder designs that permit the user to easily collect and store a variety of articles. A particular implementation employs a body and an arm slidably connected to the body.

A particular aspect broadly includes a device holder including a body having a receiving opening, an arm having a first engagement member on a first end and a second engagement member on a second end, the first engagement member releaseably secured within the receiving opening and the second engagement member slidably secured to the body.

In particular implementations, the second engagement member may permit rotational movement of the arm at the second end. The body may further include a slot and the second engagement member may be secured within the slot. The second engagement member may further include a plurality of teeth and the slot may further include a plurality of teeth. The second engagement member may further include a release tab to disengage the slot and second engagement teeth. The teeth may permit movement in a first direction without compressing the release tab and the teeth may permit movement in a second direction only during compression of the release tab. The device may further include an orifice defined by the body and the arm for receiving an article, wherein movement in the first direction may decrease a size of the orifice and movement in the second direction may increase the size of the orifice.

In additional particular implementations, the body may further include a release button and wherein compressing the release button permits engagement and disengagement of the first end first engagement member. The release button may be spring biased to a closed position. The device may further include a lanyard connected to the body for holding the device holder. The body may further include a groove to receive a portion of the arm when the arm is in the open position. The first engagement member may be rotatably secured within the body receiving opening. The body and the arm may be composed of a rigid plastic. The body may further include a handle. The handle may be rotatable. The handle may be rotatable for at least 360 degrees. The handle may rotate about an axis generally perpendicular to an orifice defined by the body and the arm.

A particular aspect may broadly include a device holder including a body having a receiving opening, an arm pivotably secured to the body on a first end and releaseably secured to the body on a second end, a handle connected to the body, and wherein the handle is rotatable.

In particular implementations, the handle may rotate about an axis generally perpendicular to an orifice defined by the body and the arm.

A particular aspect may include a method of using a device for handling or storing one or more items, the device having a body and an arm, each having a hinge end and an outer end with an inner retaining surface and an outer press surface extending between the ends, such that the device has a first open position, a plurality of second closed positions in which the outer ends are engaged and the inner retaining surfaces are in confronting relationship, the method including: placing the body and the arm into the open position, passing the one or more items through a space defined between the outer ends in the open position of the device, placing the device into one of the plurality of closed positions with the one or more items therein, and decreasing the size of the space around the one or more items by pushing on one of the press surfaces to move a position of the hinge ends.

BRIEF DESCRIPTION OF THE DRAWINGS

Features of particular embodiments and implementations of device holders will hereinafter be described in conjunction with the appended drawings, where like designations denote like elements, and.

DETAILED DESCRIPTION

Accordingly, there are a variety of device holder implementations.

Figure 1:
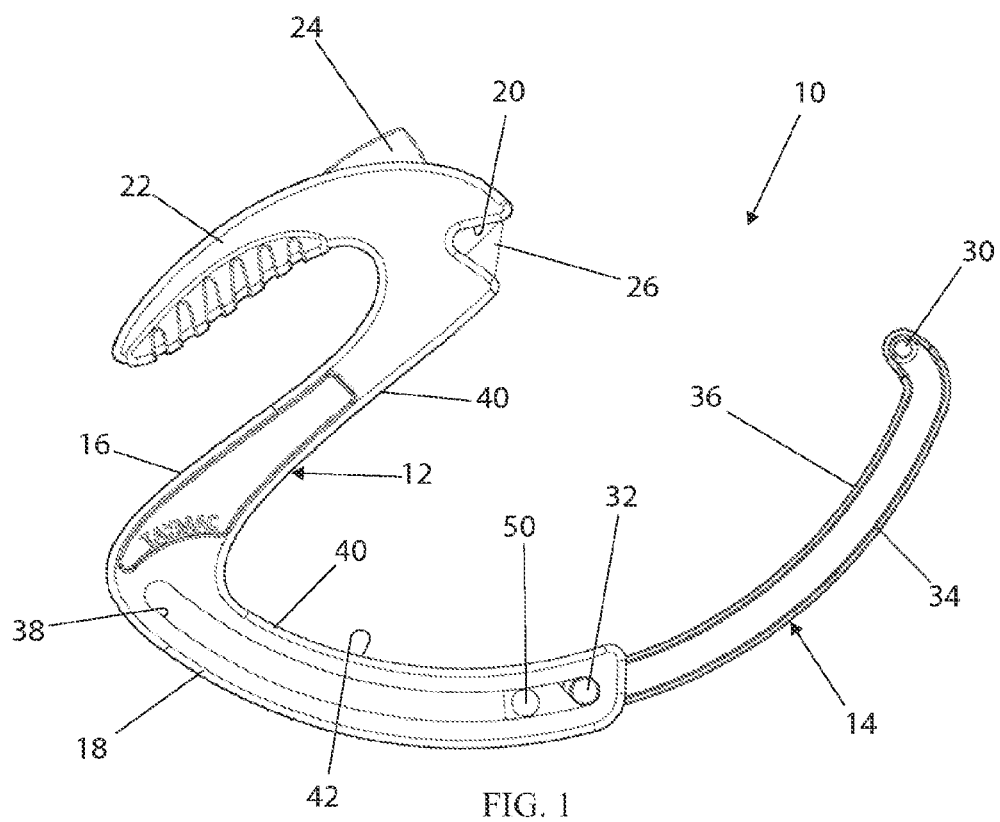
FIG. 1 is a front elevation view of a device holder in the open position and adjusted to the largest orifice size.
Figure 2:
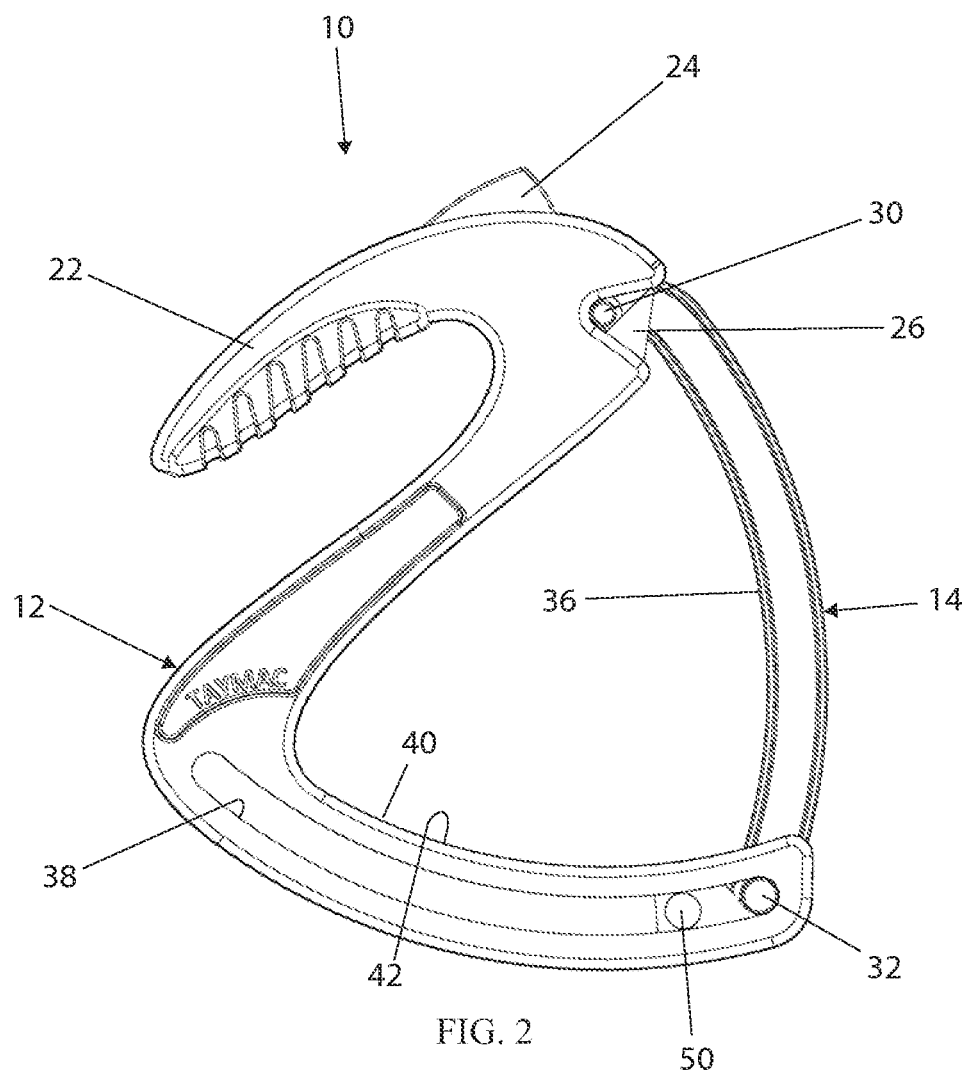
FIG. 2 is a front elevation view of a device holder in the closed position and adjusted to the largest orifice size.
Figure 3:
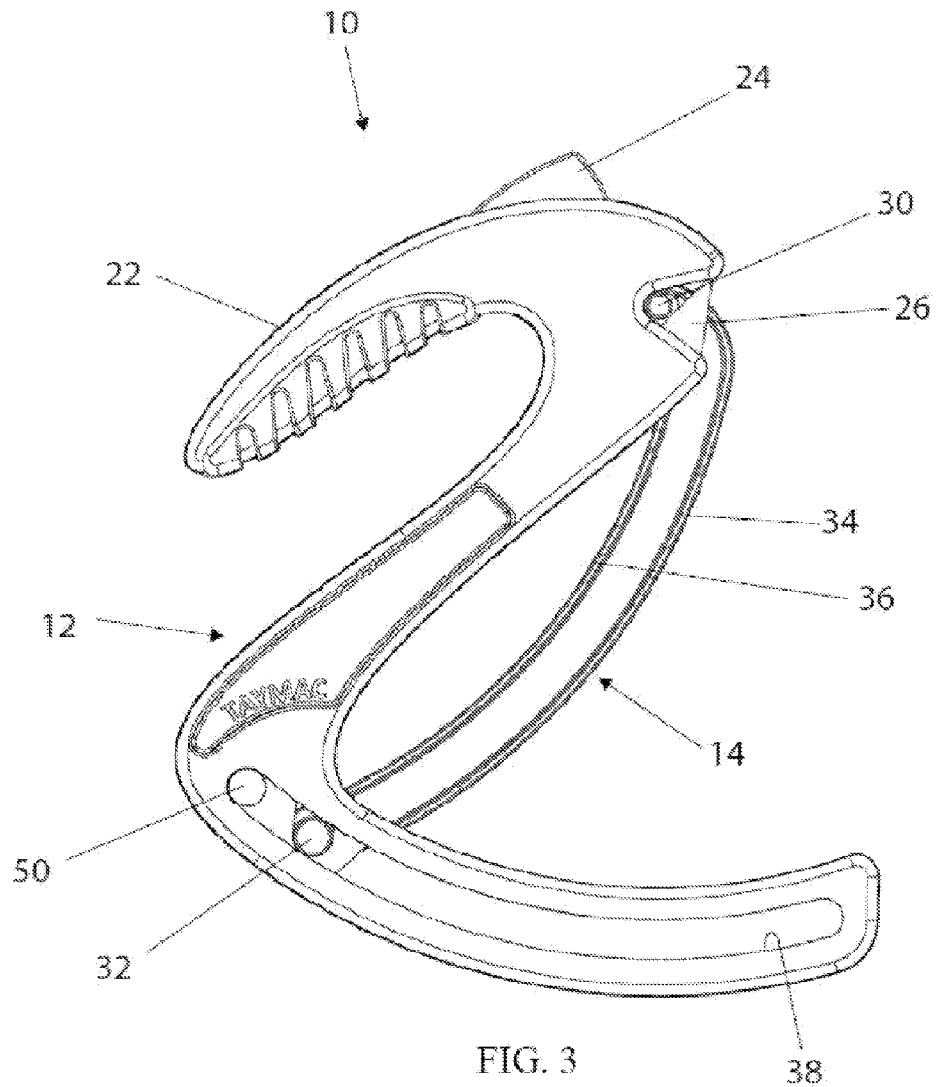
FIG. 3 is a front elevation view of a device holder in the closed position and adjusted to the smallest orifice size.
Figure 3:
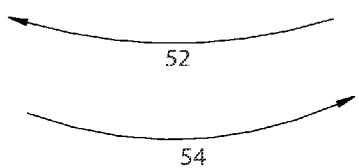

FIGS. 1 though 6 illustrate a first aspect device holder 10 having a body 12 and an arm 14. Body 12 includes a first portion 16 connected to a second portion 18, wherein the first and second portions may be angled with respect to one another. Body 12 also includes a receiving portion 20, a handle 22, and a release button 24 providing movement of a locking mechanism 26. Locking mechanism 26 extends at least partially within receiving portion 20 and is spring biased to the closed position by a spring or other biasing mechanism 28 preferably maintained within body 12. Locking mechanism 26 may include an angled outer portion so that the closing action of arm 14 forces the locking mechanism downward to compress spring 28. Further, the inner portion of locking mechanism 26 is not angled to prevent the arm from forcing the locking mechanism open during opening movement of arm 14.

Arm 14 includes a first end with a first engagement member 30 in the form of protrusions, while a second end includes a second engagement member 32 opposite the first engagement member. The arm also includes an outer press surface 34 opposite an inner retaining surface 36. Both the outer press surface and the inner retaining surface extend between the first and second engagement members.

Second engagement member 32 is slidably secured within a slot 38 in both second portion 18. Specifically, slot 38 extends through a side wall of the second portion and a top wall of the second portion throughout the desired length of the second portion. Still further, body 12 also includes an inner retaining surface 40, which is arranged to face the inner retaining surface 36 of the arm when the holder is in any one of the many closed positions. Advantageously, inner retaining surfaces 36 and 40 together define an orifice 42. Orifice 42 is used to hold one or more articles during transit or for bundling articles during storage.

Second engagement member 32 also includes a pivot mount 44 located within slot 38. Pivot mount 44 permits the second end of the arm to pivot freely within the slot to open and close off the orifice. Advantageously, pivot mount 44 is the only pivotal or rotational movement between body 12 and arm 14.

The second engagement member 32 also includes a sliding housing 46 which is mounted within slot 38 and is slidable along the length of slot 38. Sliding housing 46 also includes a plurality of teeth 48. The sliding housing teeth 48 are preferably angled to provide sliding movement without operating a release tab 50 in the decreasing direction, while requiring compression of release tab 50 in the increasing direction. The decreasing direction is sliding movement of sliding housing 46 in the direction indicated by arrow 52, but broadly includes movement in a direction which yields a smaller orifice 42. On the other hand, the increasing direction is sliding movement of sliding housing 46 in the direction indicated by arrow 54, but broadly includes movement in a direction which yields a larger orifice 42.

Figure 4:
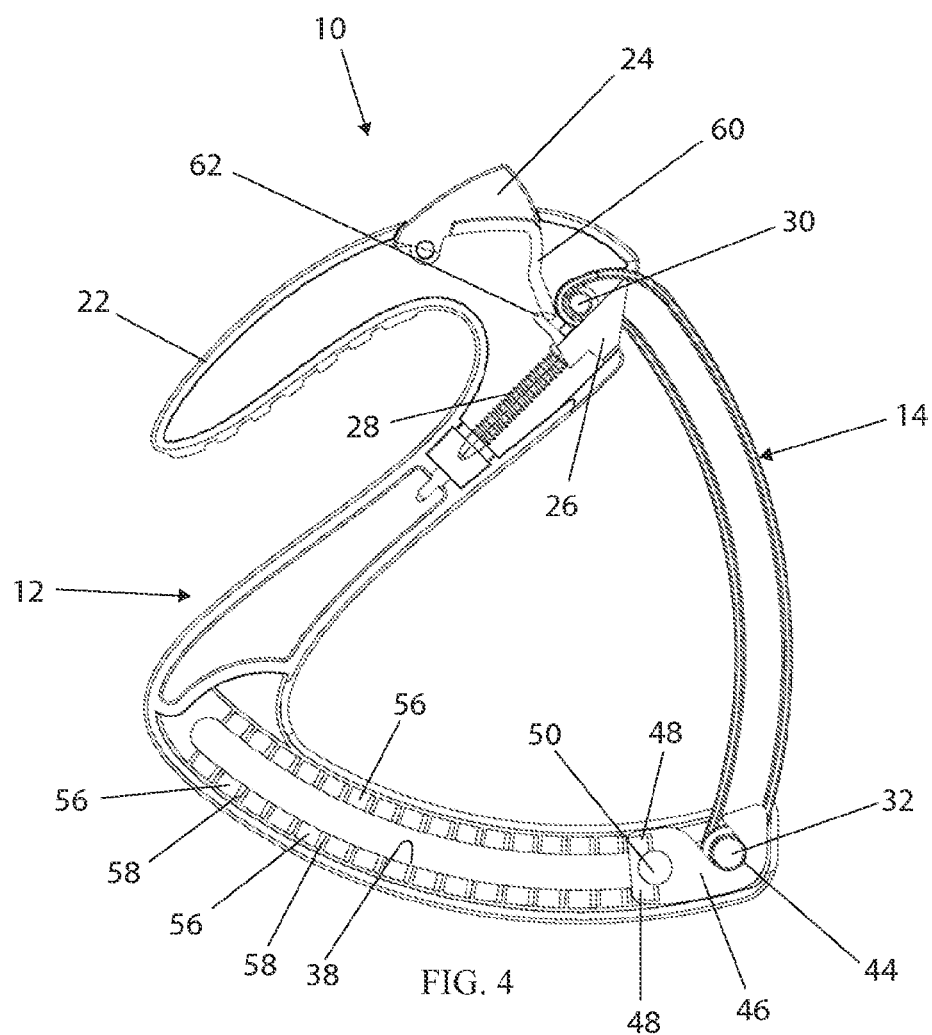
FIG. 4 is a partial sectional view with half of the body removed to show teeth in the body.
Figure 5:
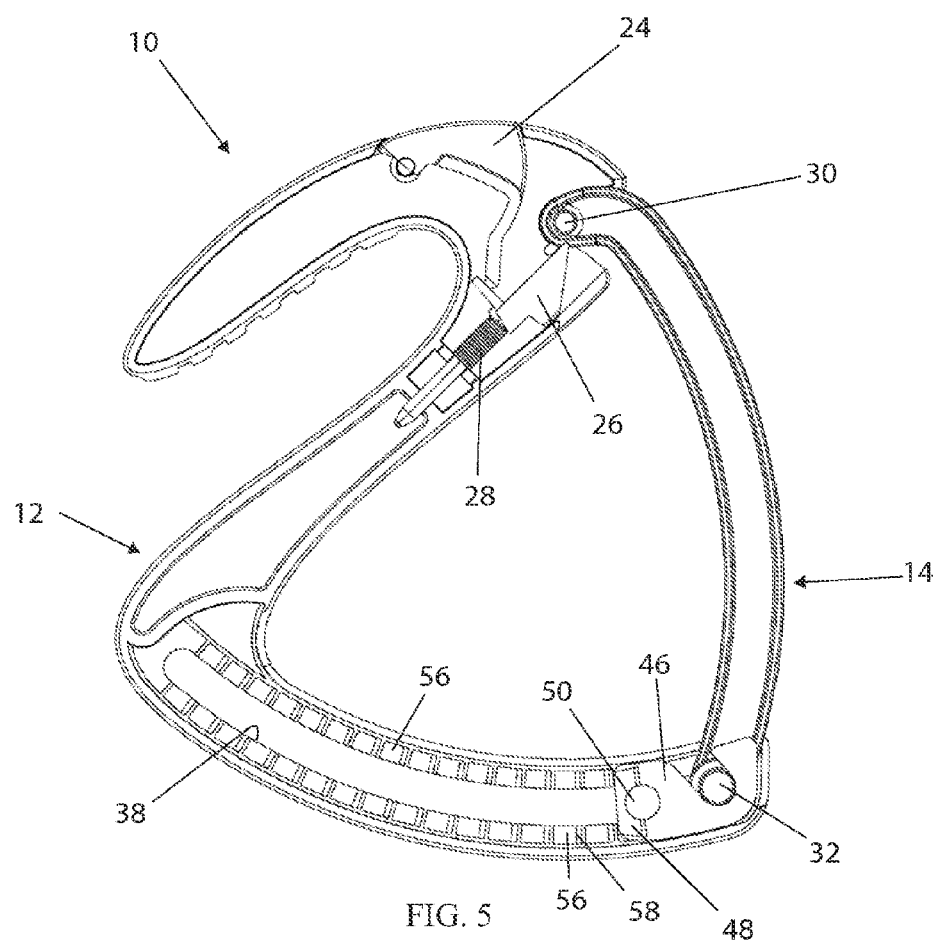
FIG. 5 is a partial sectional view with half of the body removed to show the release mechanism moved to an open position.

As particularly seen in FIGS. 4 and 5, body 12 and specifically slot 38 includes a plurality of teeth 56 complimentary shaped with teeth 48 on the sliding housing. The slot teeth 56 also include a ledge 58 defining the tallest portion of each of teeth 56 on the closing side so that the sliding housing can freely move in the closing direction without further manipulation, but requires depression of release tab 50 to move the arm in the opening direction.

As discussed above, slot 38 includes an opening or groove along the body inner retaining surface to receive a portion of arm 14. Specifically, when sliding housing 46 is moved in the smaller orifice direction (arrow 52), the pivoting position of the second engagement member of arm 14 is moved to a position where a portion of arm 14 rests within the groove of slot 38 as the arm pivots open (see FIG. 6). The groove is wide enough to receive the arm during the opening motion and assures that there is sufficient space to receive the one or more articles within orifice 42.

FIG. 4 also illustrates a detailed view of one aspect of release button 24. Arm 14 pivots about pivot mount 44 and a user may compress release button 24 to releaseably receive first engagement member 30 within receiving portion 20. Release button 24, in one aspect, may be connected to an extension arm 60 which contacts a table 62 connected to both locking mechanism 26 and spring 28. During operation, release button 24 is compressed and vertically operates extension arm 60 and table 62. The movement at table 62 compressing spring 28 and locking mechanism 26 to permit vertical movement of the locking mechanism to thereby selectively release the first engagement member 30. When the user stops pushing on release button 24, spring 28 forces the latching mechanism to the closed position as well as table 62, extension arm 60, and release button 24.

Figure 6:
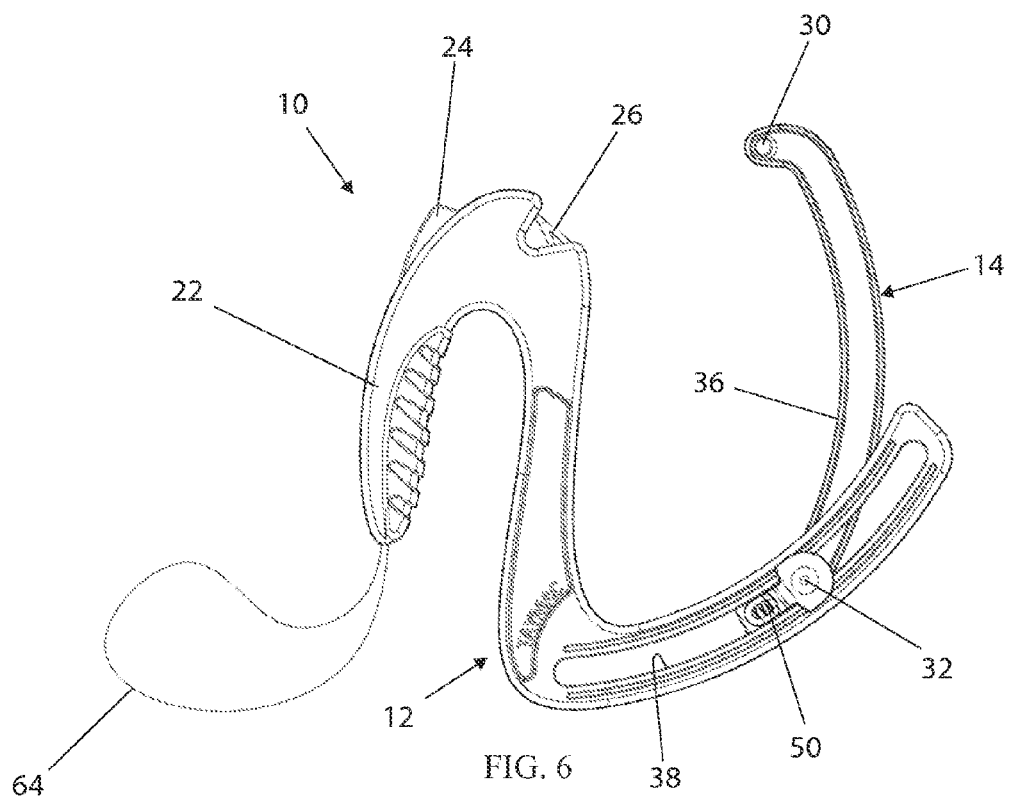
FIG. 6 is a front elevation view of a device holder in the open position and adjusted to a smaller orifice size; and, FIG. 7 is a front elevation view of a device holder with a rotatable handle.

Referring to FIG. 6, a lanyard 64 is shown extending from handle 22. Lanyard 64 may be connected to any portion of device holder 10 and is useful for carrying and holding the device holder. Specifically, a user may carry a plurality of device holders by placing them over his or her hand, and/or hanging the device holder by the lanyard to store the device holder.

Figure 7:
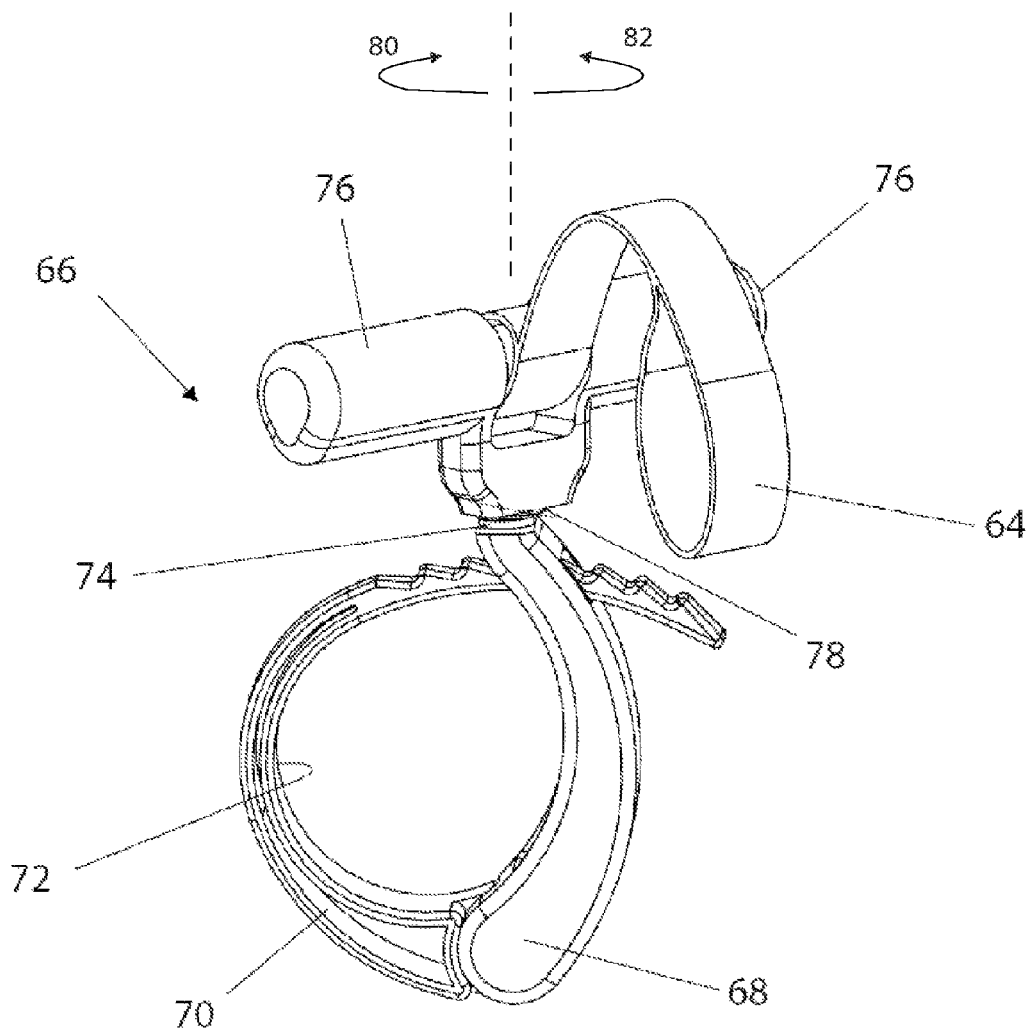

FIG. 7 illustrates a second aspect device holder 66 having a body 68 and an arm 70, which together define an orifice 72 therein. A swivel mount 74 is connected to body 68 and a handle 76 connects to swivel mount 74. Specifically, handle 76 includes an attachment portion 78 arranged to receive swivel mount 74 of body 68 so that the swivel mount and attachment portion may rotate with respect to one another, thereby permitting rotational movement between the body and the handle. In one aspect, neither the swivel mount nor the attachment portion limit the rotational movement, and movement beyond 360 degrees may be obtained in the directions associated with arrows 80 and 82. The rotation in the directions associated with arrows 80 and 82 is generally perpendicular to the direction of inserting one or more articles into orifice 72. In the same aspect, a stop (not shown) may be incorporated to limit the rotational movement to 90 degrees, 180 degrees, 270 degrees, or any other suitable amount. Still further, handle 76 also includes a lanyard 64 which functions identical to the previously disclosed lanyard above.

The method of operating the device holder includes pushing the pressing surfaces towards one another to initially locate the first engagement member within the receiving opening. With the first engagement member secured by the locking mechanism, the second engagement member may be slidingly moved to decrease the size of the orifice and surround the articles therein. Nevertheless, the second engagement member may also be moved to decrease the size of the orifice without having the first engagement member held in place by the locking mechanism. Should the user wish to increase the size of the orifice, the user compresses the release tab to permit the second engagement member to slide and increase the size of the orifice. Should the user wish to release the first engagement member, the user simply compresses the release button and the first engagement member may be removed. Thus, it is seen that a user can simply and effectively bundle a variety of articles within the orifice and selectively determine the size of the orifice for effectively moving and storing articles. Still further, the user can easily release the articles, transport the articles, or store the articles with the device holder.

In these and in any other embodiments, the device holder may be made of any materials and fabricated and/or assembled in any manner. For instance the device holder may be manufactured from various different pieces and then screwed or glued together. In one embodiment for instance the body is molded of two pieces of plastic which are then ultrasonic welded together. The various elements, such as a lever, a finger opening, a body, a finger grip, a projection, and so forth, may be manufactured as one piece or may be manufactured as separate pieces to be joined together.

It will be understood that implementations are not limited to the specific components disclosed herein, as virtually any components consistent with the intended operation of a method and/or system implementation for a device holder may be utilized. Accordingly, for example, although particular bodies, arms, springs, and other components are disclosed, such components may comprise any shape, size, style, type, model, version, class, grade, measurement, concentration, material, weight, quantity, and/or the like consistent with the intended operation of a method and/or system implementation for a device holder. Implementations are not limited to uses of any specific components, provided that the components selected are consistent with the intended operation of a method and/or system implementation for a device holder.

Accordingly, the components defining any device holder implementation may be formed of any of many different types of materials or combinations thereof that can readily be formed into shaped objects provided that the components selected are consistent with the intended operation of a device holder implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any device holder implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld (e.g. an ultrasonic weld), a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The use of a device holder may comprise the following steps: winding up a cable on a device holder while a rigid/flexible arm is in an open position; placing the rigid/flexible arm in a closed position; hanging/storing the cable and device holder. The use of a device holder may comprise the following steps: winding up a cable; placing a device holder around the wound cable by placing the open rigid/flexible arm around the wound up cable and placing the rigid/flexible arm in a closed position, thus retaining the wound up cable in an orifice of the device holder; and hanging/storing the cable and device holder.

The implementations listed here, and many others, will become readily apparent from this disclosure. From this, those of ordinary skill in the art will readily understand the versatility with which this disclosure may be applied.

The invention claimed is:

1. A device holder comprising:
a body having a receiving opening;
an arm having a first engagement member on a first end and a second engagement member on a second end;
the first engagement member releaseably secured within the receiving opening and pivotally connecting the arm to the body at the first engagement member; and,
the second engagement member slidably secured to the body, the second engagement member being slidable while the first engagement member is pivotally attached to and laterally secured to the body to adjust a size of an opening defined by the body and the arm.

2. The device holder of claim 1 wherein the second engagement member permits rotational movement of the arm at the second end.

3. The device holder of claim 1 wherein the body further comprises a slot and the second engagement member is secured within the slot.

4. The device holder of claim 3 wherein the second engagement member further comprises a plurality of teeth and the slot further comprises a plurality of teeth.

5. The device holder of claim 4 wherein the second engagement member further comprises a release tab to disengage the slot and second engagement member teeth.

6. The device holder of claim 5 wherein the teeth permit movement in a first direction without compressing the release tab and the teeth permit movement in a second direction only during compression of the release tab.

7. The device holder of claim 6 further comprising an orifice defined by the body and the arm for receiving an article, wherein movement in the first direction decreases a size of the orifice and movement in the second direction increases the size of the orifice.

8. The device holder of claim 1 wherein the body further comprises a release button and wherein compressing the release button permits engagement and disengagement of the first end of the first engagement member.

9. The device holder of claim 8 wherein the release button is spring biased to a closed position.

10. The device holder of claim 1 further comprising a lanyard connected to the body for holding the device holder.

11. The device holder of claim 1 wherein the body further comprises a groove to receive a portion of the arm when the arm is in an open position.

12. The device holder of claim 1 wherein the first engagement member is rotatably secured within the body receiving opening.

13. The device holder of claim 1 wherein the body and the arm are composed of a rigid plastic.

14. A device holder, comprising:
a body having a receiving opening; and an arm having a first engagement member disposed at a first end and a second engagement member disposed at a second end, the first engagement member being releasably connectable and pivotable to the body such that the body and arm define an opening therebetween, and the second engagement member being adjustably connectable to the body to adjust a size of the opening.

15. The device holder of claim 14, wherein the second engagement member is slidably secured to the body.

16. The device holder of claim 14, wherein the second engagement member is received by a slot in the body.

17. The device holder of claim 14, wherein the slot permits movement of the second engagement member in a first direction and substantially prevents movement of the second engagement member in a second and opposite direction.

18. The device holder of claim 17, wherein a release tab connected to the second engagement member is depressed to allow movement of the second engagement member in the second direction.

19. The device holder of claim 14, wherein a spring-biased locking member allows the first engagement member to be connected to the body and prevents removal of the first engagement member.

20. The device holder of claim 14, wherein a release button is depressed to move the spring-biased locking member to a position to allow removal of the first engagement member from the body.

21. A device holder comprising:
a body having a receiving opening and a slot, the slot having a first plurality of teeth;
an arm having a first engagement member on a first end and a second engagement member on a second end;
the first engagement member releaseably secured within the receiving opening;
the second engagement member having a second plurality of teeth and being slidably secured within the slot of the body; and
a release tab to disengage the first and second pluralities of teeth of the slot and the second engagement member.

22. The device holder of claim 21, wherein the first and second pluralities of teeth permit movement of the second engagement member in a first direction in the slot without compressing the release tab and the first and second pluralities of teeth permit movement of the second engagement member in a second direction in the slot only during compression of the release tab.

23. A device holder comprising:
a body having a receiving opening;
an arm having a first engagement member on a first end and a second engagement member on a second end;
the first engagement member releaseably secured within the receiving opening;
the second engagement member slidably secured to the body;
a release button connected to the body such that compressing the release button permits engagement and disengagement of the first end engagement member; and
a spring biasing the release button to a closed position.

* * * * *